United States Patent
Beall et al.

(10) Patent No.: US 7,315,683 B2
(45) Date of Patent: Jan. 1, 2008

(54) OPTICAL WAVEGUIDES FORMED IN GLASS-CERAMIC MATERIALS AND METHOD FOR MAKING SAME

(75) Inventors: George Halsey Beall, Big Flats, NY (US); Nicholas Francis Borrelli, Elmira, NY (US); Bryce Neilson Samson, Granby, CT (US)

(73) Assignee: Corning Incorporated, Corning, NY (US)

( * ) Notice: Subject to any disclaimer, the term of this patent is extended or adjusted under 35 U.S.C. 154(b) by 122 days.

(21) Appl. No.: 11/178,004

(22) Filed: Jul. 8, 2005

(65) Prior Publication Data

US 2006/0051047 A1 Mar. 9, 2006

Related U.S. Application Data

(60) Provisional application No. 60/608,716, filed on Sep. 9, 2004.

(51) Int. Cl.
*G02B 6/00* (2006.01)
(52) U.S. Cl. .................................... 385/141; 385/129
(58) Field of Classification Search ......... 385/141–145
See application file for complete search history.

(56) References Cited

U.S. PATENT DOCUMENTS 6,300,262 B1 * 10/2001 Beall .............................. 501/5
6,632,757 B2 10/2003 Beall .............................. 501/5
6,660,669 B2 12/2003 Beall et al. ..................... 501/5
6,690,873 B2 2/2004 Bendett et al. ............. 385/132
2006/0009342 A1* 1/2006 Sirota et al. .................. 501/10

OTHER PUBLICATIONS

L. B. Glebov et al, "Planar optical waveguides on glasses and glassceramic materials", Proceedings of the SPIE, vol. 1513, Glasses for Optoelectronics II (1991), pp. 56-70.
G. O. Karapetyan et al, "Electrooptic glasses and glass-ceramics for elements controlling laser radiation", Proceedings of the SPIE, vol. 4353 (2001), pp. 23-28.
A. A. Lipovskii et al, "Optical waveguides in electrooptical nanophase glass-ceramics", Materials Letters 58 (2004), pp. 1231-1233, Mar. 2004.
S. Najafi et al, "Gradient-Index Glass Waveguide Devices", *Handbook of Photonics*, 1997 CRC Press LLC, pp. 502-512.

* cited by examiner

*Primary Examiner*—Sarah Song
(74) *Attorney, Agent, or Firm*—Robert L. Carlson

(57) ABSTRACT

Optical waveguides are fabricated in glass-ceramic materials utilizing an ion-exchange process to pattern the waveguide at a temperature below the ceramming temperature of the glass-ceramic material. The optical waveguides may include optically-active dopants dispersed preferably within the crystallite phase of the glass-ceramic material.

10 Claims, 4 Drawing Sheets

US 7,315,683 B2

OPTICAL WAVEGUIDES FORMED IN GLASS-CERAMIC MATERIALS AND METHOD FOR MAKING SAME

CROSS-REFERENCE TO RELATED APPLICATIONS

This application claims the benefit of, and priority to U.S. Patent Application Ser. No. 60/608,716 filed on Sep. 9, 2004.

BACKGROUND OF THE INVENTION

1. Field of the Invention

The present invention relates generally to optical waveguides, and more particularly to optical waveguides fabricated in glass-ceramic materials.

2. Technical Background

The term "glass" is most commonly defined as an amorphous, inorganic material which solidifies from a molten state without crystallization, and may therefore be better characterized as a supercooled liquid having an irregular atomic structure rather than a solid. Glasses are most frequently fabricated by fusing selected silicates with certain oxides. In contrast, a "glass-ceramic" material possesses both a glass (or vitreous) phase and a crystallite phase within a unitary structure. The glass phase forms a matrix having a characteristic porosity, within which the crystallite phase is dispersed. There are a variety of methods for fabricating glass-ceramic materials. Glass and glass-ceramic materials are generally both regarded as dielectrics, meaning they are non-conductive, have very low electrical conductivity, or transmit electric force or electromagnetic radiation via a process other than electrical conduction.

The term "optical waveguide" has a variety of different definitions, each somewhat dependent upon the particular technical embodiment, practical application, or field of use being considered. One area of particular interest relates to optical telecommunications, or the transmission of information or data via light waves propagating through waveguides such as optical fibers. Another area of interest relates to photonics, or the development of devices which produce, amplify, guide, or control the properties of light to achieve some useful purpose, such as optical amplifiers, lasers, switches, biosensors, and myriad other devices. It is readily apparent that many photonic devices are designed for and used in optical telecommunications, but may similarly be implemented in a variety of other scientific and industrial applications as well. The transmission of light in specific infrared or near-infrared bands is of greatest interest for optical telecommunications, but other applications in the infrared, visible, and ultraviolet spectra are meaningful in different photonics applications. As a general rule, waveguides support or control the propagation of light using variations in the refractive index of materials within the waveguide (such as between adjacent materials, layers, interfaces, boundaries, or along gradients). As used herein, the term "optical waveguide" is therefore intended to mean structures fabricated from one or more dielectric materials defining variations in refractive index which support and/or control the propagation of light, most notably in the infrared, visible, and/or ultraviolet spectra.

Certain characteristics of glass-ceramic materials make them particular interesting to researchers in the telecommunications and photonics fields. For example, the ability to "dope" or impregnate selected portions of a waveguide with optically-active materials (such as erbium or other rare-earth constituents) allows them to be used to produce or amplify light, thus creating the basis for devices such as fiber lasers, optical amplifiers, or wavelength converters.

The structure of glass-ceramic materials is particularly suited to such applications, because the porosity of the glass phase and resulting homogeneity of the glass matrix surrounding the crystallite phase can be employed to control the size and distribution of crystalline particles that would otherwise produce undesirable scattering or attenuation of light within the waveguide. Furthermore, glass-ceramics may be fabricated in which the coefficient of thermal expansion (CTE) of the glass phase is the opposite of that for the crystallite phase, resulting in a glass-ceramic material having very high dimensional and thermal stability and low internal stresses through a range of temperature variations. For example, a low-thermal-expansion ceramic providing a crystallite phase having a negative CTE can be combined with a glass phase having a positive CTE to yield a thermally-stable glass-ceramic material which exhibits a negligible overall CTE within a prescribed range of operating temperatures.

However, glass-ceramic materials do present identifiable limitations for use in fabricating optical waveguides. Most notably, many conventional processes used to fabricate waveguides on a large scale require that an intermediate structure be elevated to temperatures near or above the ceramming temperatures used for conventional glass-ceramic materials. For example, drawing a glass perform into an optical fiber requires heating the perform above its softening point. Similarly, overcladding a planar waveguide may require both applying soot glass using an outside vapor deposition (OVD) or modified chemical vapor deposition (MCVD) process, and then consolidating the glass structure, both steps being performed at a relatively high temperature. Processes such as drawing a glass perform are inconsistent with glass-ceramic materials, as internal discontinuities within the glass-ceramic structure may weaken the tensile strength of the drawn glass-ceramic fiber and result in fractures and breaks. Moreover, heating the glass-ceramic to temperatures at or near the ceramming temperature may cause undesirable alterations in the porosity of the glass matrix, the composition of the crystalline phase, or fluctuations in the particle size, distribution, or homogeneity of the crystalline structures.

SUMMARY OF THE INVENTION

Optical waveguides are fabricated in glass-ceramic materials according to the present invention by utilizing an ion-exchange process to pattern all or a portion of the waveguide at a temperature below the ceramming temperature of the glass-ceramic material.

DETAILED DESCRIPTION OF THE INVENTION

Figure 1:
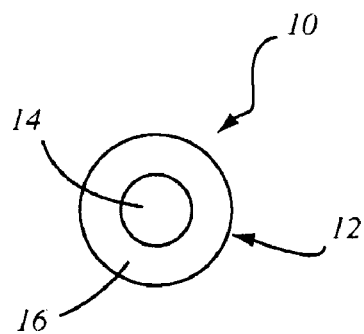
FIG. 1 is a diagrammatic end elevation view of an optical fiber type optical waveguide having a core and a cladding that are generally circular in cross section.

The invention will now be described in detail with reference to a few exemplary embodiments, as further illustrated in the accompanying tables and drawing Figures. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawing Figures and discussions that follow.

The terms optical waveguide 10 or optical waveguide structure 10 may be used interchangeably herein, and are intended to mean physical structures fabricated from one or more dielectric materials defining variations in refractive index which support and/or control the propagation of light, most notably in the infrared, visible, and/or ultraviolet spectra.

Referring to FIG. 1, one example of a common optical waveguide 10 is an optical fiber 12 having a inner core 14 and a circumferential cladding 16. The radial proportions of the core 14 and cladding 16 are not shown to scale. The optical fiber 12 shown in FIG. 1 is roughly representative of a step-index profile, in which the cladding 16 has first index of refraction, and the core 14 has a second index of refraction. The refractive index of the core 14 is relatively higher than the refractive index of the cladding 16, which in turn is relatively lower than the refractive index of the core 14. As discussed throughout this specification, the refractive indices of different regions within the optical waveguide 10 are referred to as being relatively higher or relatively lower compared with one another although the actual refractive indices may differ in absolute values by only tens, hundredths, or thousandths, insofar as it is this variation in refractive index that meaningfully supports or controls the propagation of light within the optical waveguide. It is also well known to those of skill in the art of optical waveguides that optical fibers 12 are routinely fabricated with more complex refractive index profiles extending from the center of the core 14 to the periphery of the outer cladding 16, and the profiles may include features such as peaks, troughs, moats, rings, and plateaus. These refractive index profiles are produced in a glass optical fiber 12 by selectively doping and depositing glass soot in layers on a perform (with the dopants being selected from materials known to raise or lower the index of refraction of the glass), and then drawing that perform into the optical fiber 12. It will also be appreciated by those skilled in the art that differentiating the region regarded as the core 14 of the fiber 12 from the cladding 16 may be subject to interpretation, based on an analysis of how the energy of one or more modes of light are distributed within and controlled by the variations in refractive indices within the optical fiber 12.

Figure 2:
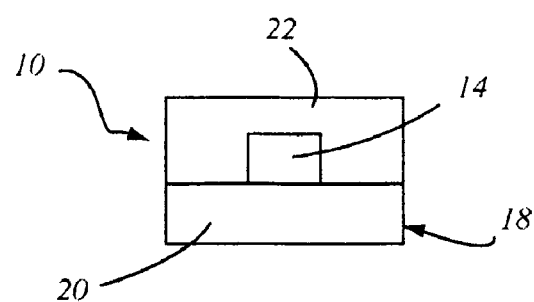
FIG. 2 is a diagrammatic end elevation view of a planar optical waveguide having a core that is generally rectangular in cross section, an over-cladding layer, and an under-cladding layer.

Referring to FIG. 2, another common example of an optical waveguide 10 is a planar waveguide 18 having a substrate or under-cladding layer 20, a core 14, and an over-cladding 22. Again, the proportions of the core 14 and cladding layers 20, 22 are not necessarily shown to scale. The planar waveguide 18 shown in FIG. 2 is similarly roughly representative of a step-index profile, in which the core 14 has a refractive index relatively higher than the refractive indices of both the under-cladding 20 and the over-cladding 22, though the refractive indices of the under-cladding 20 and the over-cladding 22 may differ from one another. For simplicity, the under-cladding 20 and over-cladding 22 may be referred to collectively as the cladding 16 or cladding layers 16 to distinguish them from the core 14, and depending on the particular fabrication process being utilized may constitute multiple layers or regions of materials that are deposited separately and have different characteristic indices of refraction, and/or regions that have had their characteristic index of refraction modified or altered through doping, photolithography, or other chemical or optical techniques.

Figure 3:
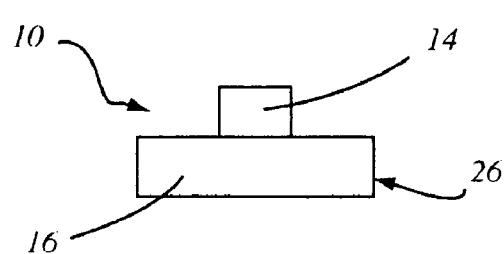
FIG. 3 is a diagrammatic end elevation view of a strip type channel waveguide.
Figure 4:
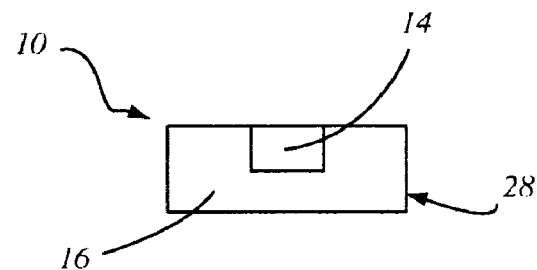
FIG. 4 is a diagrammatic end elevation view of an embedded-strip type channel waveguide.
Figure 5:
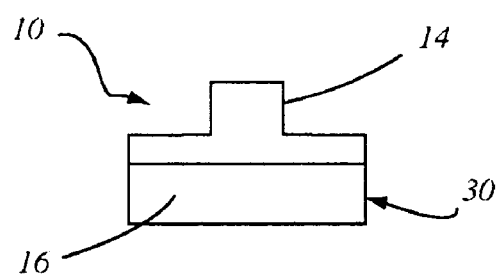
FIG. 5 is a diagrammatic end elevation view of a rib or ridge type channel waveguide.
Figure 6:
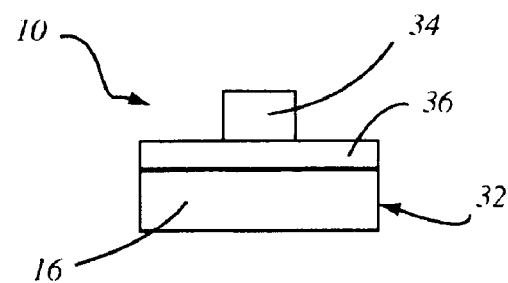
FIG. 6 is a diagrammatic end elevation view of a strip-loaded type channel waveguide.

Referring to FIGS. 3-6, planar waveguides 18 may also take on other basic forms, conventionally referred to collectively as channel waveguides 24, including examples such as the strip waveguide 26 shown in FIG. 3, embedded-strip waveguide 28 shown in FIG. 4, rib or ridge waveguide 30 shown in FIG. 5, and strip-loaded waveguide 32 shown in FIG. 6. In each of these channel waveguides 24, the core 14 and cladding layers 16 are identified generally. In each of these embodiments of channel waveguides 24, a portion of the core 14 is exposed to and therefore surrounded by air (or other ambient atmosphere) which has a relatively low refractive index compared with the core 14 and serves as an over-cladding layer 22. In the case of the embedded-strip waveguide 28, the top surface of the waveguide may be overclad with a lower-index material to create a planar waveguide 18 of the type previously shown and discussed in relation to FIG. 2. In the case of the strip-loaded waveguide 32, the structure is generally similar to that of the strip waveguide 26, however the raised strip 34 is disposed on the surface of an intermediate layer 36 having an even higher refractive index than both the strip 34 and the under-cladding layer 16 or substrate, and the strip 34 further has a higher refractive index than that of the under-cladding layer 16 or substrate.

For purposes of discussing representative embodiments or illustrative examples of the optical waveguide 10 and fabrication method of the present invention, the term channel waveguide 24 is hereafter generally intended to reflect an embedded-strip waveguide 28, as that form of channel waveguide 24 is considered the best suited for illustrating and conveying an understanding of optical waveguides 10 fabricated utilizing the ion-exchange process of the present invention in planar embodiments. Those skilled in the art will readily appreciate that there are a variety of conventional processes available for fabricating channel waveguides 24 in glass and polymer materials, including exposing portions of a photosensitive glass layer to a laser or other light source capable of inducing a change in the refractive index, depositing and/or etching layers of materials having characteristic indices of refraction, and excavating or hollowing-out channels in a substrate that are subsequently filled with a higher-index material. These techniques may include masking, etching, ablation, and photolithographic techniques well known to those in the field of fabricating optical waveguide and semiconductor structures.

The present invention relates to optical waveguides 10 in which a portion of the structure defining the core 14, cladding 16, or both are fabricated from a glass-ceramic material. For illustrative purposes, a transparent forsterite glass-ceramic preferably including a crystallite phase chrome content (in a form such as chromium oxide) was selected, as the composition, fabrication, and material and optical properties of such a glass-ceramic material is considered well understood by those of skill in the field of glass-ceramic materials and has representative applicability to those skilled in the field of optical waveguide applications such as amplifiers, lasers, and other active devices containing rare-earth and other dopants. Further description of the composition, fabrication, and material and optical properties of such glass-ceramics may be obtained by reference to U.S. Pat. Nos. 6,300,262; 6,632,757; and 6,660,669 as well as the various references and articles cited and discussed therein.

For clarification, a composition of a chrome-doped forsterite glass-ceramic that is suitable for illustrating a representative embodiment of the present invention is shown below in Table I:

TABLE I

| Composition | Weight Percent (Wt %)* |
|---|---|
| $SiO_2$ | 48 |
| MgO | 21 |
| $AL_2O_3$ | 13 |
| $TiO_2$ | 8 |
| $Na_2O$ | 5 |
| $K_2O$ | 4 |
| $Cr_2O_3$ | 0.2 |

*does not total 100%

Figure 7:
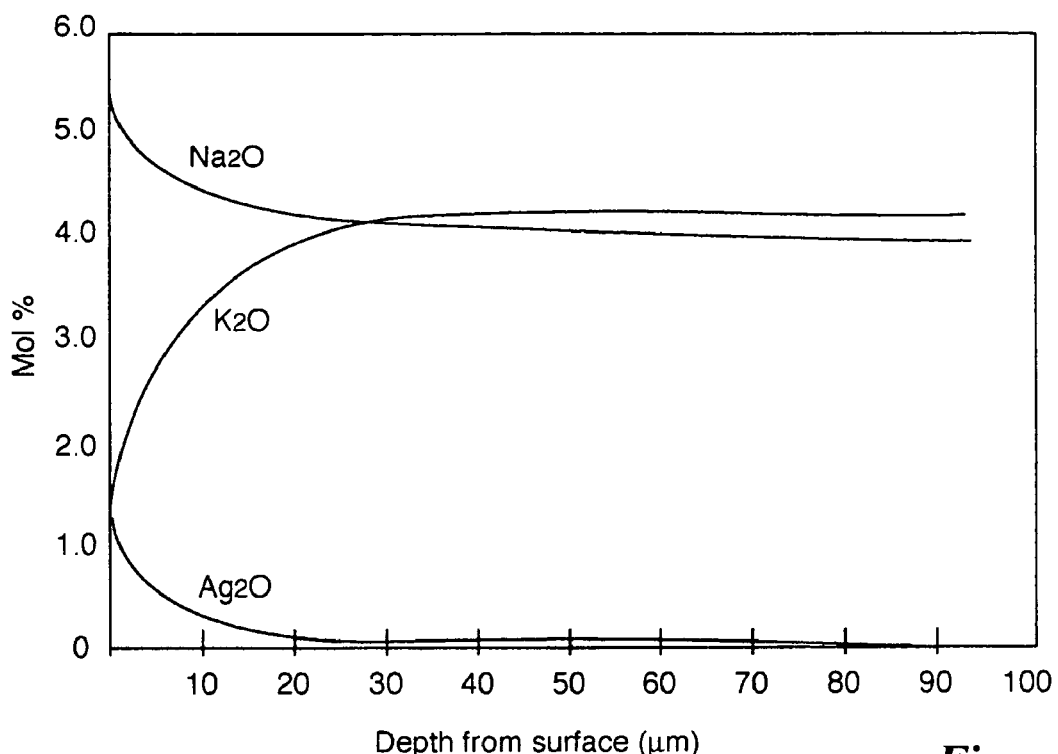
FIG. 7 is a graph demonstrating the results of electron probe micro analysis (EPMA) comparing the ion distribution of $Na_2O$, $K_2O$, and $Ag_2O$ in mol % relative to the physical depth from the sample surface after ion exchange.
Figure 8:
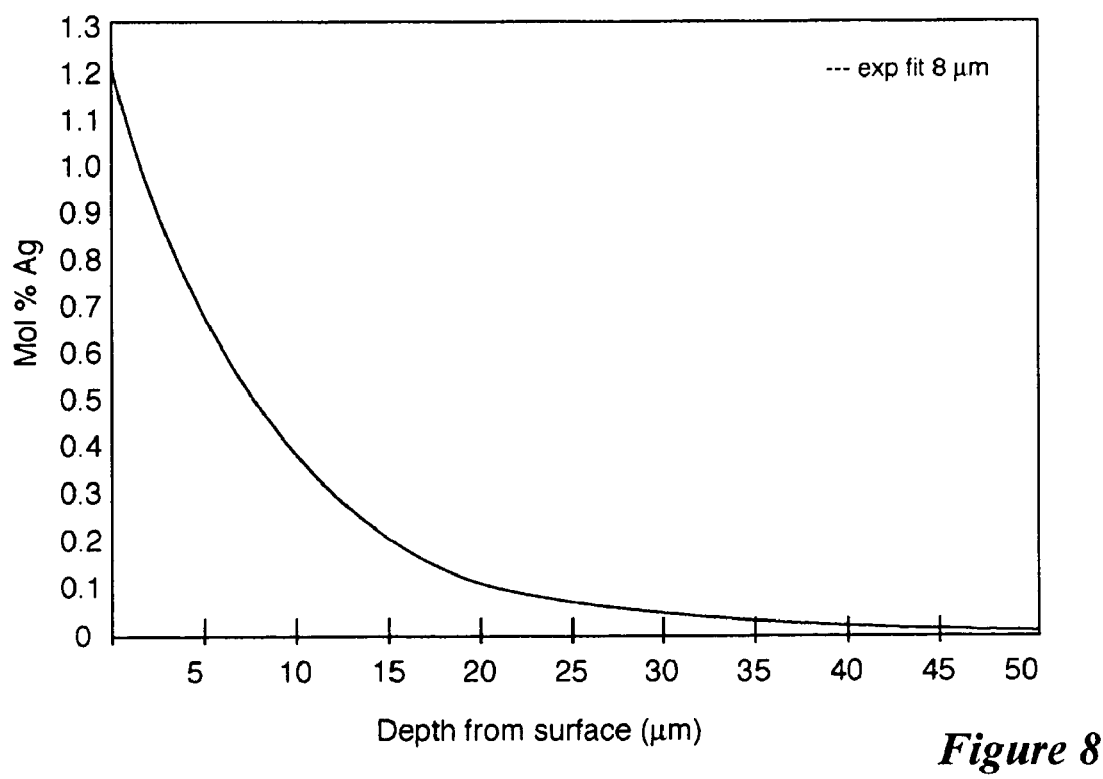
FIG. 8 is a graph demonstrating the generally exponential relationship between the Ag ion concentration profile relative to the physical depth from the sample surface after ion exchange.
Figure 9:
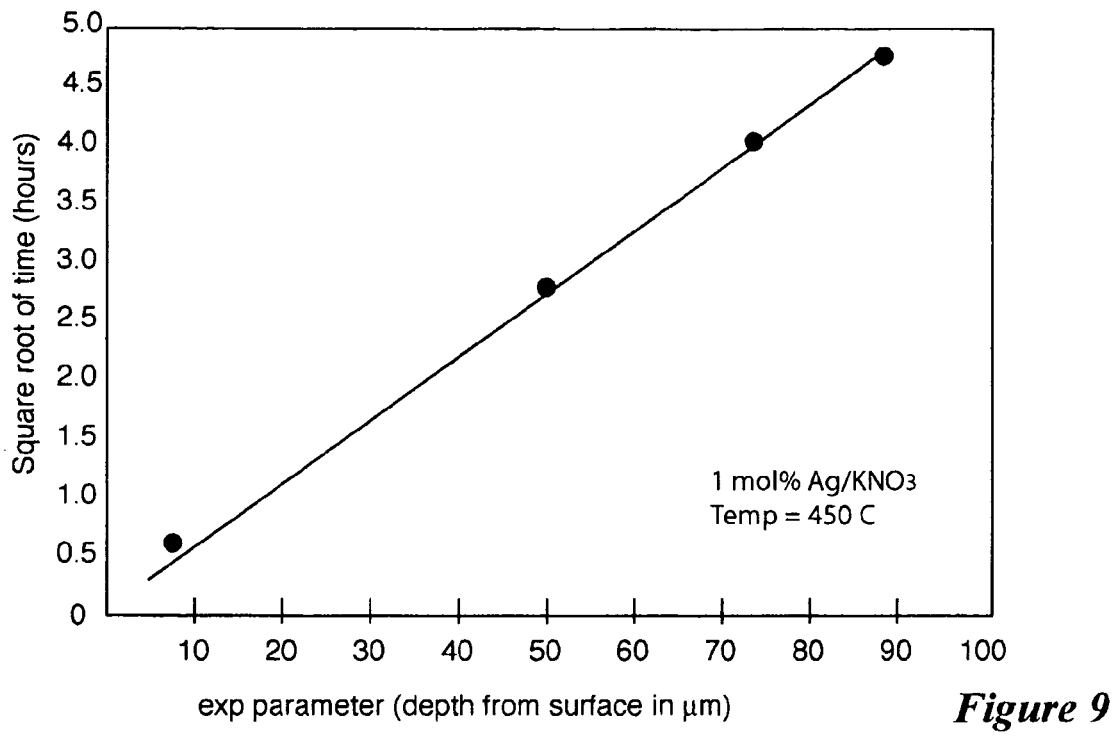
FIG. 9 is a graph demonstrating the generally proportional relationship between the diffusion depth and the square root of the immersion time (for a series of varying immersion time periods in similar donor immersion baths and temperatures)
Figure 10:
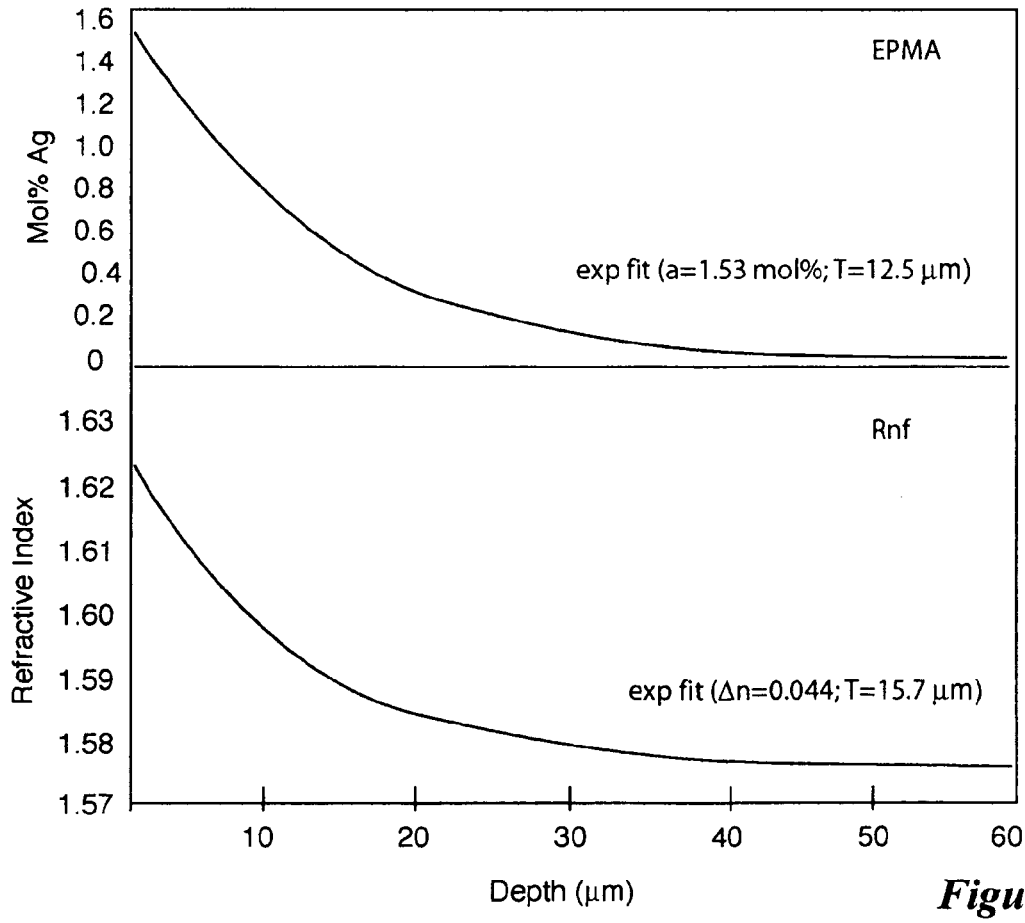
FIG. 10 is a dual graph demonstrating the correlation between the change in Ag ion concentration (upper) and refractive index change (lower) relative to physical depth from the sample surface after ion exchange.

As an representative illustration, a sample of this glass-ceramic composition immersed in a 1 mole percent $Ag/KNO_3$ (1 mol % Ag) ion donor bath for approximately 22 minutes at 450° C. will result in ion exchange, with Ag ions diffusing into the glass phase in exchange for mobile Na ions exiting. (Some exchange of K ions for Na ions also expectedly occurs.) The presence of Ag metal that would lead to increased scattering loss is not detected. The corresponding electron probe micro analysis (EPMA) data comparing the ion distribution in mol % relative to the physical distance from the sample edge for $Na_2O$, $K_2O$, and $Ag_2O$ are shown generally in FIG. 7. The Ag ion concentration profile for this sample is shown in FIG. 8, depicting a generally exponential relationship between ion concentration and depth. Exposing comparable samples to the same bath under similar circumstances for varying time periods identifies a proportional relationship between the diffusion depth and the square root of the immersion time, as shown generally in FIG. 9. Comparison of the data for both Ag concentration (mol % Ag) and refractive index (refractive near field measurement) relative to depth between zero and 60 microns demonstrates a correlation between Ag ion concentration and refractive index change, namely on the order of about 0.044 change in refractive index value over the approximately 1.5 mol % Ag concentration range at 633 nm wavelength using this particular glass-ceramic composition and a 30 minute immersion at 450° C., as shown generally in FIG. 10.

Observation of the fluorescence of samples of optical waveguides 10 fabricated as described herein show that the fluorescence is not appreciably altered by the ion-exchange process, indicating that the ion-exchange process does not meaningfully impact the active $Cr^{4+}$ ions residing in the forsterite nano-crystals (likely explained by the Ag ions introduced by ion exchange accumulating nearly completely within the glass phase rather than the crystallite phase of the glass ceramic.) Backward propagation of the fluorescence increases measurably due to the waveguiding phenomenon. For purposes of comparison with other glass-ceramic compositions and ion-exchange immersions, using the chrome-doped forsterite glass-ceramic composition and ion exchange process (with a 1 mole percent $Ag/KNO_3$ bath at 450° C. as described herein), sample waveguides 10 demonstrating optical losses as low as about 0.5 dB/cm over 7 cm length samples can be obtained, with the expected average attenuation being approximately 0.6 dB/cm. Higher losses would be expected at the 980 nm $Cr^{4+}$ absorption peak, and may increase depending on factors such as the purity and processing rigor surrounding production of the glass-ceramic material, scattering losses induced by sub-optimal crystallite particle formation or clumping, and residual $Cr^{3+}$ absorption. As noted above, other optically-active dopants (including rare-earth elements such as erbium), or conventional dopants such as metals and metal oxides, may also be incorporated into the crystallite phase of the glass-ceramic material rather than a chrome-containing, chromium-containing, or chromium oxide constituent.

Samples prepared using the above illustrative process do not display a step-index profile within the region of diffusion, but rather a gradient distribution of ion concentrations and refractive indices. It is understood from the fabrication of gradient-index (GRIN) glass materials using single- and double-ion exchange processes that the refractive index profiles and loss (attenuation) properties of the resulting glass materials are difficult to calculate or estimate effectively, and may often be better determined through direct empirical analysis. It is also understood that the present invention may be applied to a variety of glass-ceramic compositions and ion-exchange modalities other than the representative examples discussed herein merely for illustrative purposes, and that optical properties such as the refractive index profile, attenuation, single-mode cutoff dimensions, and many others will vary dramatically depending upon the initial glass-ceramic composition, the ion exchange modality and process parameters, the physical structure of the samples and resulting waveguides, the extent of subsequent cladding or reverse ion-exchange that is applied, subsequent patterning (photolithographic or otherwise), and potentially other factors specific to the particular waveguide embodiment being fabricated. Consequently, guidance on the general methodology for calculating or estimating refractive index changes, attenuation, and related optical properties for glass-ceramic materials subject to single- or double-ion exchange may be developed from sources dealing with ion exchange in glass materials, such as the discussion by S. I. Najafi and S. Honkanen, *Gradient-Index Glass Waveguide Devices*, Handbook of Photonics, pp. 502-512 (CRC 1996) and the various references and articles cited and discussed therein, with suitable modification required given the inherent nano-structural and compositional distinctions between glass and glass-ceramic materials.

Figure 11A:
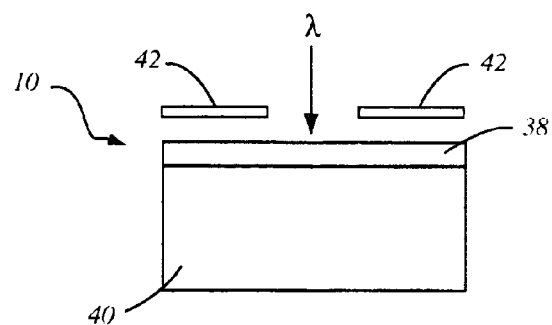
FIG. 11a is a diagrammatic end elevation view of a sample of glass-ceramic material with an ion-exchange mask layer deposited thereon, having a photolithographic exposure mask disposed in close proximity to the ion-exchange mask layer and exposed to a wavelength of electromagnetic radiation.
Figure 11B:
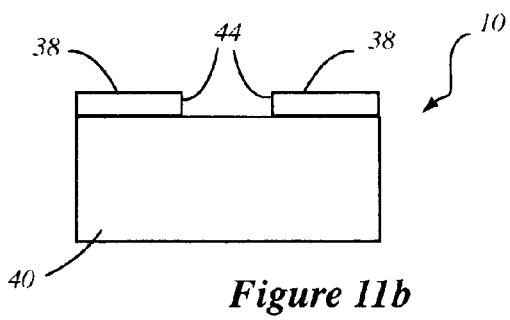
FIG. 11b is a diagrammatic end elevation view of the sample of FIG. 11a in which a portion of the ion-exchange mask layer has been etched or washed away to define achannel exposing the surface of the sample.
Figure 11C:
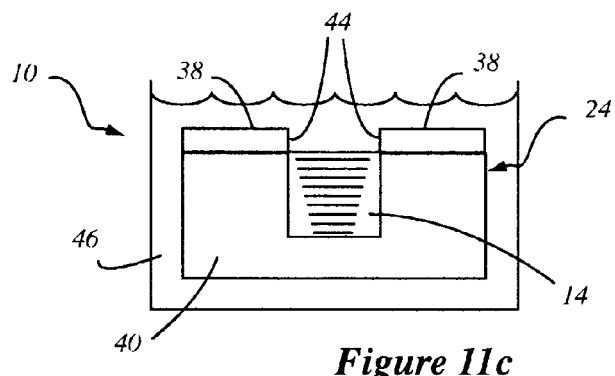
FIG. 11c is a diagrammatic end elevation view of the sample of FIG. 11b in which the sample has been immersed in an $Ag/KNO_3$ molten salt bath to precipitate ion exchange, with the relatively higher refractive index core of a channel waveguide being formed in the sample, and in which the degree of ion exchange and corresponding changes in refractive index are visually depicted by horizontal lines, with lines of greater length denoting relatively higher refractive index compared with that of shorter lines.
Figure 11D:
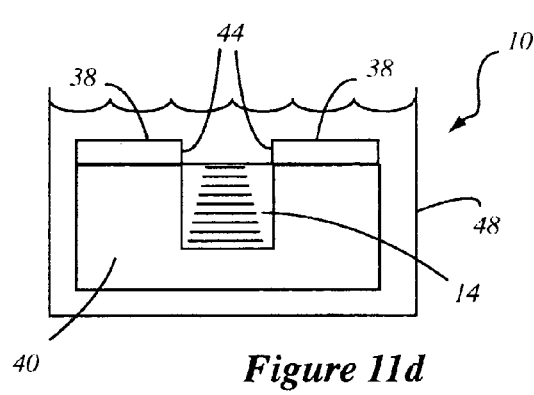
FIG. 11d is a diagrammatic end elevation view of the sample of FIG. 11c in which the sample has been immersed in an $Na/KNO_3$ molten salt bath to precipitate ion exchange, with an relatively lower refractive index overcladding layer being formed between the bottom of the channel and the surface of the sample, and in which the degree of ion exchange and corresponding changes in refractive index are visually depicted by horizontal lines, with lines of greater length denoting relatively higher refractive index compared with that of shorter lines.
Figure 11E:
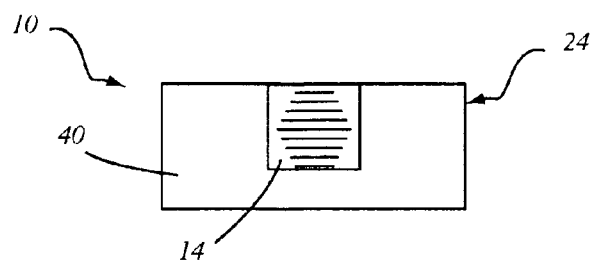
FIG. 11e is a diagrammatic end elevation view of the buried ridge channel waveguide fabricated by the process steps depicted in FIGS. 11a-11d in which the buried ridge, and in which the degree of ion exchange and corresponding changes in refractive index are visually depicted by horizontal lines, with lines of greater length denoting relatively higher refractive index compared with that of shorter lines.
Figure 11F:
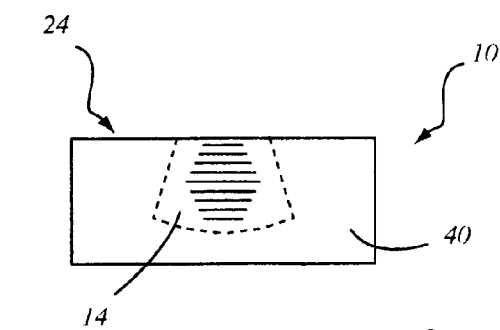
FIG. 11f is a diagrammatic end elevation view of the buried ridge channel waveguide of FIG. 11e, wherein a hypothetical diffusion pattern of ions departing from the vertical planes defining the channel walls as shown in FIG. 11e is shown by phantom lines.

Referring again to the example of a buried ridge channel waveguide 24 as shown in FIG. 4 and described above, the chrome-doped forsterite glass-ceramic composition and ion exchange process utilizing a 1 mole percent $Ag/KNO_3$ bath at 450° C. can similarly be used to fabricate a buried ridge channel waveguide 24 using conventional lithographic techniques. This process is illustrated in FIGS. 11a-11e. An ion-exchange mask layer 38 of silicon or photoresist is deposited on the surface of a sample 40 of the chrome-doped forsterite glass-ceramic composition, exposed by UV radiation through an exposure mask 40 and/or ion-beam etched or washed to produce one or more channels 44 in the ion-exchange mask layer 38 extending along the sample 40 and exposing its surface. The coated and etched sample 40 is immersed in the $Ag/KNO_3$ bath 46 for a suitable period to achieve the desired levels of refractive index change and ion exchange depth forming the core 14 of the channel waveguide 24. In FIG. 11c, the degree of Na→Ag ion exchange and corresponding change in refractive index are visually depicted by horizontal lines, in which lines of greater length denote greater levels (in mol % as described above) of ion exchange and corresponding increase in refractive index. The ion-exchange mask layer 38 may be removed from the sample 40 and the resulting channel waveguide 24 characterized. Alternately, an over-cladding layer 22 may be formed above the core 14 by placing the sample 40 in an equivalent or suitable mole percent $Na/KNO_3$ bath 46 for a period sufficient to "back-exchange" or bury the core 14 under an over-cladding layer 22 of lower refractive index than the core 14 (but not necessarily as low a refractive index as the surrounding glass-ceramic material of the sample 40 at distances from the surface and the core 14 where ion exchange did not take place). In FIGS. 11d and 11e, the degree of Ag→Na ion exchange and Na→Ag back-exchange, as well as the corresponding changes in refractive index, are visually depicted by horizontal lines, in which lines of greater length denote greater levels (in mol % as described above) of increased or relatively higher refractive index corresponding to increased Ag ion levels relative to Na, versus decreased or relatively lower refractive index corresponding to increased Na ion levels relative to Ag. The ion-exchange mask layer 38 layer may be removed from the sample 40 and the resulting channel waveguide 24 characterized. Again, some exchange of K ions for Na and Ag ions may also occur in each step involving immersion in a $KNO_3$-containing bath. Those of skill in the field of fabricating optical waveguides 10 will readily appreciate that the ion-exchange process described above will not by itself produce a buried ridge channel waveguide 24 in which the side walls of the channel or core 14 are generally vertical (or perpendicular to the surface) as shown in FIGS. 11d and 11e, because some degree of diffusion of the Ag ions into the sample 40 (and subsequent diffusion of Na ions back into the sample 16 ) will radiate outwardly or laterally under each confronting edge of the channel 44 formed in the ion-exchange mask layer 38, resulting in a pattern shown diagrammatically (and not to scale) by the phantom lines in FIG. 11f.

As noted above, the present invention is not directed or limited to a specific glass-ceramic material, such as the chrome-doped forsterite glass-ceramic composition utilized herein as an illustration to aid in a better understanding of how one would practice this invention and apply the teachings to other glass-ceramic compositions having utility in designing an optical waveguide structure 10. Similarly, the particular ion exchange processes or chemistries described herein are merely examples proven suitable for use with the chrome-doped forsterite glass-ceramic composition to produce operative changes in desired ion concentrations to induce refractive index profiles that function in fabricating waveguide structures 10. As such, these embodiments are intended merely as examples which those of skill may utilize when practicing and analyzing the present invention to better understand its application (and expected consequences when applied) to other suitable glass-ceramic compositions.

It may further be appreciated that a variety of related ion-exchange techniques may be employed to fabricate optical waveguides 10 having specified geometries or complex structures, as well as to promote or induce higher degrees of ion transport given certain glass-ceramic compositions and donor immersions. For example, rather than the single-ion, molten-salt technique described in the embodiments above, ion-exchange techniques such as those employing silver film ion exchange, ionic masking, or double ion exchange may be utilized where practical to achieve alternate results that are better suited to the design of the particular optical waveguide 10 and its intended use or application, as well as potentially offering cost, reproducibility, or economy-of-scale advantages when fabricating certain optical waveguides 10. It is, of course, intended that other ion exchange processes know to those skilled in the art but not expressly described or referenced herein may similarly be employed to fabricate glass-ceramic optical waveguides 10 according to the present invention, and that subsequently devised techniques, procedures, materials, or improvements in the area of ion exchange may be employed beneficially when practicing the present invention.

While the invention has been described with respect to a limited number of illustrative embodiments, those skilled in the art, having benefit of this disclosure, will appreciate that other embodiments can be devised which do not depart from the scope of the invention as disclosed and claimed herein. Accordingly, the scope of the invention should be limited only by the attached claims, and not restricted or narrowed by implication or reference to the examples and embodiments described in this specification.

What is claimed is:

1. An optical waveguide comprising:
    a forsterite glass-ceramic material having a glass phase, a crystallite phase, and a refractive index; and
    an ion-exchanged dopant dispersed within at least one region of the glass-ceramic material such that the at least one region has a relatively higher refractive index or a relatively lower refractive index compared with the refractive index of the glass-ceramic material not containing the ion-exchanged dopant.

2. The optical waveguide of claim 1 in which the optical waveguide further comprises:
    a optically-active dopant dispersed within the crystallite phase of the glass-ceramic material.

3. The optical waveguide of claim 2 in which the optically-active dopant dispersed within the crystallite phase of the glass-ceramic material is selected from a group consisting of a chrome-containing constituent, a chromium-containing constituent, or a chromium oxide.

4. The optical waveguide of claim 3 in which the optically-active dopant dispersed within the crystallite phase of the glass-ceramic material is a rare-earth element.

5. The optical waveguide of claim 1 in which the ion-exchanged dopant is an Ag ion, and the at least one region has a relatively higher refractive index compared with the refractive index of the glass-ceramic material not containing the ion-exchanged dopant.

6. The optical waveguide of claim 1 in which the ion which is exchanged for the ion-exchanged dopant is an Na ion, and the at least one region has a relatively lower refractive index compared with the refractive index of the glass-ceramic material not containing the ion-exchanged dopant.

7. A method for making an optical waveguide, the method comprising the steps of:
    providing a forsterite glass-ceramic material having a glass phase, a crystallite phase, and mobile ions, the glass ceramic material having a refractive index; and
    exposing the glass-ceramic material to an ion donor so as to exchange predetermined ions from the ion donor with the mobile ions from the glass-ceramic material to form an ion-exchanged region having either a relatively higher refractive index or a relatively lower refractive index compared with the refractive index of the glass-ceramic material not containing the predetermined ions.

8. The method of claim 7 wherein the step of providing the glass-ceramic material further comprises the step of:
    providing an optically-active dopant dispersed within the crystallite phase of the glass-ceramic material.

9. The method of claim 7, wherein the glass-ceramic material further comprises an optically-active dopant dispersed within the crystallite phase of the glass-ceramic material, said optically-active dopant selected from the group consisting of a chrome containing constituent, a chromium containing constituent, or a chromium-oxide.

10. The method of claim 7, wherein the glass-ceramic material further comprises an optically-active dopant which is a rare-earth element.

* * * * *